Figure 1:
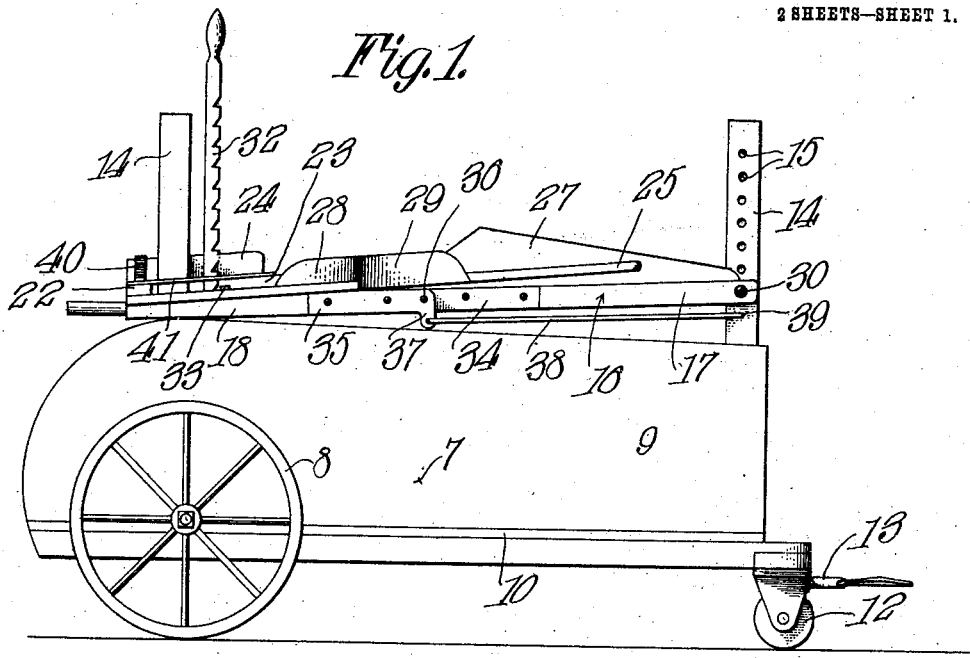

S. E. WOODS.
CORN TOPPER.
APPLICATION FILED APR. 29, 1908.

919,106.

Patented Apr. 20, 1909.
2 SHEETS—SHEET 1.

Witnesses
Chas. C. Richardson

Inventor
Samuel E. Woods,
By Chandler & Chandler
Attorneys.

THE NORRIS PETERS CO., WASHINGTON, D. C.

S. E. WOODS.
CORN TOPPER.
APPLICATION FILED APR. 29, 1908.
919,106.
Patented Apr. 20, 1909.
2 SHEETS—SHEET 2.
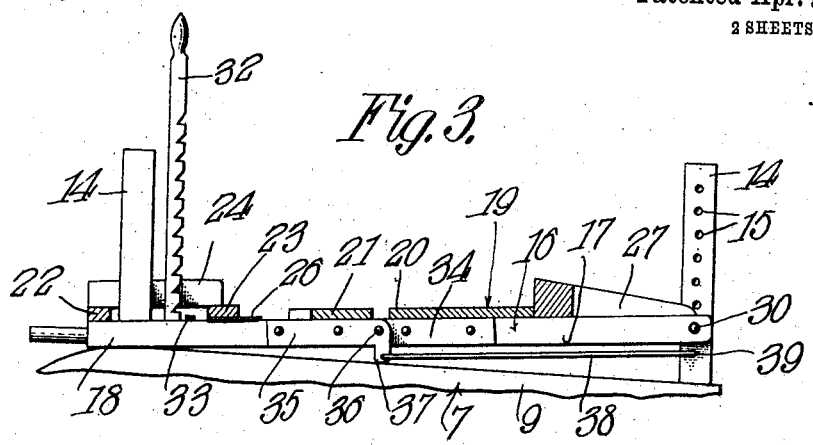
Fig. 3.
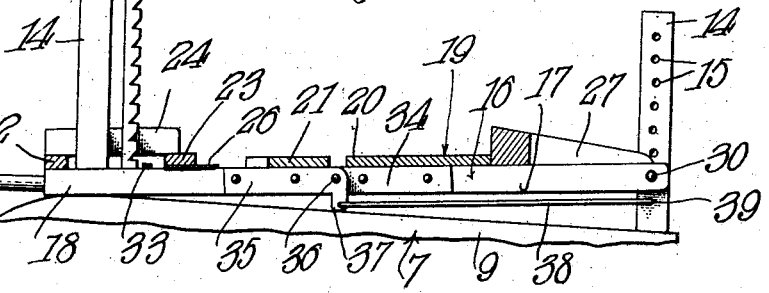
Fig. 4.
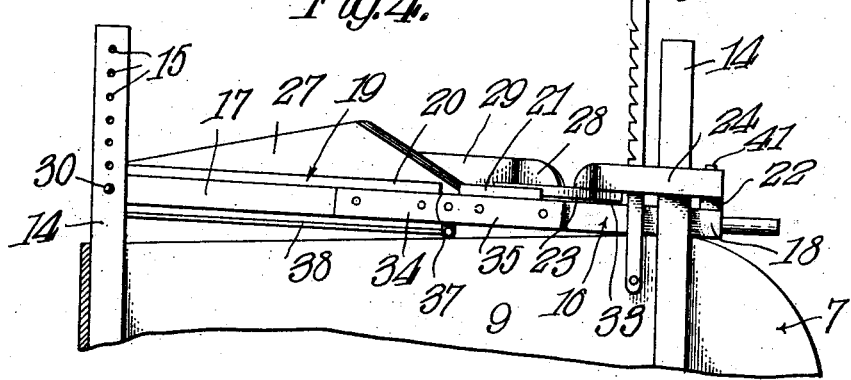
Fig. 5.
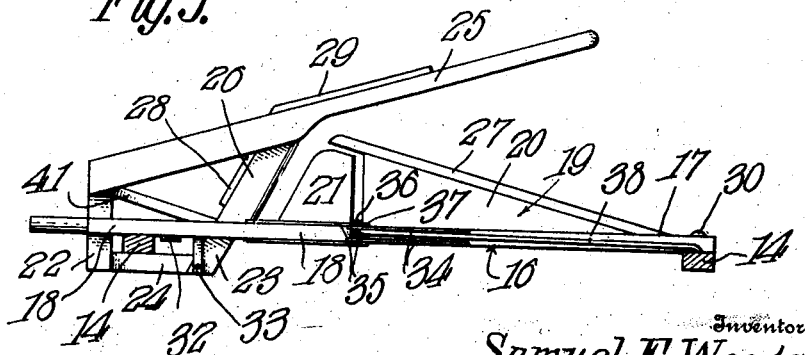
Witnesses
Chas. C. Richardson
Inventor
Samuel E. Woods,
By Chandler & Chandler
Attorneys.

UNITED STATES PATENT OFFICE.

SAMUEL E. WOODS, OF LOCKWOOD, OKLAHOMA.

CORN-TOPPER.

No. 919,106.   Specification of Letters Patent.   Patented April 20, 1909.

Application filed April 29, 1908. Serial No. 429,898.

*To all whom it may concern:*

Be it known that I, SAMUEL E. WOODS, a citizen of the United States, residing at Lockwood, in the county of Beaver, State of Oklahoma, have invented certain new and useful Improvements in Corn-Toppers; and I do hereby declare the following to be a full, clear, and exact description of the invention, such as will enable others skilled in the art to which it appertains to make and use the same.

The present invention has reference to corn-toppers and it resides, generally, in certain improvements upon the structure shown and described in my prior patent issued January 14, 1908, and numbered 876,615, such improvements including the provision of a rod disposed beneath and parallel with the front member of the supporting bar and pivoted at one end to the front upright and at the other to a depending arm formed upon a plate secured to the inner end of the rear member of said bar, the connection between said rod and arm positively effecting the breaking of the joint between said members, when the rear member is raised, to adjust the position of the knife carried by the latter member.

The invention further resides in a modified arrangement of the member with which the toothed lever is adapted for engagement, to effect the retention of the parts of the topping device in adjusted position with respect to each other.

The preferred embodiment of the invention is illustrated in the accompanying drawings, in which corresponding parts are designated by the same reference numerals in the several views.

Figure 2:
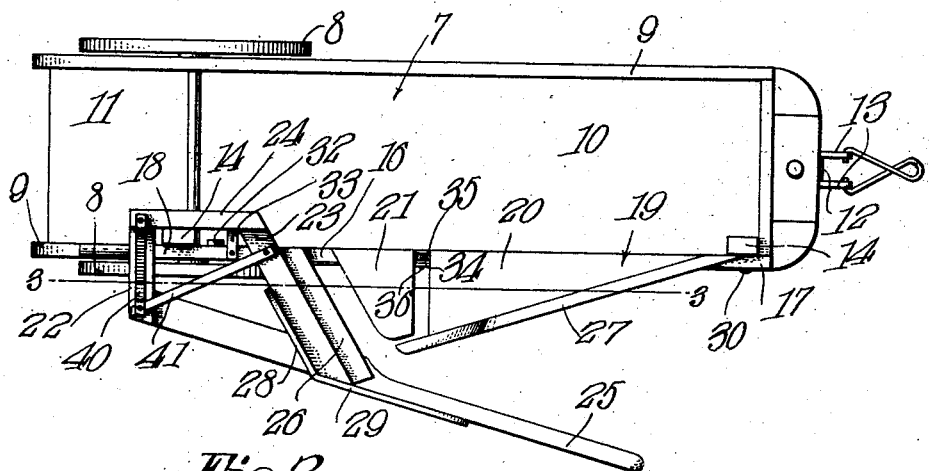

Of the said drawings, Figure 1 is a side elevation of a wagon having the improved topper attached thereto. Fig. 2 is a top plan view. Fig. 3 is a section taken on the line 3—3 of Fig. 2. Fig. 4 is a side elevation of the attachment taken from the interior of the wagon. Fig. 5 is a bottom plan view of the attachment.

Referring more particularly to the drawings, the reference numeral 7 indicates generally a wagon body provided with a pair of rear wheels 8, the side-boards 9 of the wagon-body and the floor 10 thereof extending rearwardly beyond the wheels, as shown in Fig. 2, to provide a platform 11 for the operator. The floor is likewise extended slightly beyond the front end of the wagon body, and to this extension is attached a pivoted bracket carrying a guide wheel 12, to which bracket a clevis 13 is fastened.

As shown in Fig. 1, there is a pair of uprights 14 mounted within the wagon body adjacent the opposite corners of the right hand side board, the forward upright having a vertically-arranged series of perforations 15 formed therethrough.

Connected with the uprights, as in the patented construction, is the longitudinally-disposed supporting bar 16 of the corn-topping attachment, said bar comprising front and rear members 17 and 18, whose mutually-adjacent inner ends are provided with pairs of plates 34 and 35 secured to opposite sides thereof, through whose overlapping ends passes the hinge bolt 36. The outer plate 35 is provided with a depending integral arm 37 to whose perforated lower end is pivotally connected the rear end of a longitudinal rod 38 disposed directly beneath the bar member 17 and having its front end 39 bent laterally and engaged in one of the perforations 15.

Mounted upon the supporting bar is a triangular-shaped guide plate 19 which is likewise formed in two parts, the front member 20 being connected to the front member of the bar, and the rear member 21 to the rear member of the bar. The mutually-adjacent inner ends of the members of the guide-plate are disposed parallel with each other and at right-angles to the supporting bar, each of said members therefore being in the form of a right-angled triangle.

The member 18 of the bar projects at its rear end directly over the platform 11, and is connected adjacent such end to a rear brace 22, disposed in advance of which is a brace 23, which is likewise fastened to said member intermediate its ends and projects outwardly and forwardly of the wagon body, the inner ends of the braces 22 and 23 being connected by a longitudinal brace 24. The space between said braces and the adjacent member of the supporting bar therefore forms a guide-opening through which the rear upright extends.

Secured to the outer ends of the braces 22 and 23 is a guide-arm 25, which is likewise inclined outwardly and forwardly of the wagon body and is reduced at its forward end, as shown, the reduced portion terminating in an inwardly-directed curve, adjacent which point a cutting blade 26 is secured at its outer end to said arm, the inner end of the blade being secured to the bar member 18. This blade, which fits against the under face of the forward brace 23 and is secured thereto, has its cutting edge disposed parallel with and in spaced relation to the rear edge of the member 21 of the guide plate, the apex of said member being slightly curved, as shown, to correspond with the curved terminus of the reduced portion of the guide-arm, so that when the wagon is in motion, the tops of the corn will be obviously directed by the guide-arm against the cutting edge of the blade.

The outer edge of the member 20 of the guide plate carries an upstanding triangular shoulder 27, whose beveled rear edge extends across the outer end or apex of the member 21, the opposite end of said shoulder being rounded, as shown. The brace 23 is likewise provided with an upstanding shoulder 28 secured to its rear face, said shoulder having an angular forward extension 29 which is secured to the outer face of the guide-arm 25. The braces 23 and 24 are further connected with the outer end of the brace 22 by metal straps 40 and 41.

In attaching the topping device to the wagon body, a laterally-projecting pin 30 carried by the member 17 at its front end is inserted in the perforation 15 directly above that one in which the bent end 39 of the rod 38 is fitted, and the rear upright passed through the chamber formed by the braces 22, 23 and 24, and by the rear end of the member 18 of the supporting bar, the latter being thus disposed directly above the upper edge of the adjacent side board of the wagon body.

It is thus obvious that when the members of the supporting bar and guide plate are to be inclined with respect to each other, to dispose the knife at the proper angle, the handle end of the bar member 18 is raised to the desired extent by the operator, thus breaking the joint between said members through the rod 38 which connects the forward upright 14 with the arm 37. The parts are retained in adjusted position by means of a toothed lever 32 which is pivoted to the wagon body adjacent the rear upright and is adapted for engagement with a strap 33 secured at opposite ends to the member 18 and to the front end of the brace 24. It is to be understood also that the forward bar member may be further adjusted, owing to the interchangeable engagement of its pin 30 in the perforations formed in the forward upright.

From the foregoing, it will be apparent that when the wagon is driven through the field the corn will be directed by the combined action of the front member of the guide plate and the guide arm into the channel leading to the cutting blade, the edge of which severs the tops of the corn, which fall onto the upper face of the guide plate, from thence into the wagon-body.

What is claimed is:

1. The combination, with a wagon body having a pair of uprights mounted therein adjacent the opposite ends of one of its side boards, of a corn-topping attachment connected with said uprights and comprising front and rear members hinged together at their mutually-adjacent inner ends, the front member being pivotally connected to the front upright; means for raising the rear member; and means connecting said rear member with the front upright, for breaking the joint between said members when said rear member is raised.

2. The combination, with a wagon body having a pair of uprights mounted therein adjacent the opposite ends of one of its side boards, of a corn-topping attachment connected with said uprights and comprising front and rear members hinged together at their mutually-adjacent inner ends, the front member being pivotally connected to the front upright; means for raising the rear member; means connecting said rear member with the front upright, for breaking the joint between said members when said rear member is raised; and means for retaining said members in adjusted position with respect to each other when the joint between the same is broken.

3. The combination, with a wagon body having a pair of uprights mounted therein adjacent the opposite ends of one of its side boards, of a corn topping attachment connected with said uprights and comprising front and rear members hinged together at their mutually-adjacent inner ends, the front member being pivotally connected to the front upright; means for raising the rear member; means connecting said rear member with the front upright, for breaking the joint between said members when said rear member is raised; and means adapted for engagement with said rear member when the joint between the latter and said front member is broken, to retain said members in adjusted position with respect to each other.

4. The combination, with a wagon body having a pair of uprights mounted therein adjacent the opposite ends of one of its side boards, of a corn-topping attachment connected with said uprights and consisting of a jointed guide plate comprising a front member and a rear member hinged together at their mutually-adjacent inner ends, the front member being pivotally connected with the front upright, a blade disposed parallel with and in spaced relation to the rear edge of the last mentioned member, and a guide arm for directing the corn to said blade; means for raising the rear member; and means connecting said rear member with the front upright, for breaking the joint between said members when said rear member is raised.

5. The combination, with a wagon body having a pair of uprights mounted therein adjacent the opposite ends of one of its side boards, of a corn-topping attachment connected with said uprights and comprising front and rear members hinged together at their mutually-adjacent inner ends, the front member being pivotally connected to the front upright; means for raising the rear member; a depending arm carried by said rear member; and a rod connected at opposite ends to said arm and to the front upright, for breaking the joints between said members when said rear member is raised.

6. The combination, with a wagon body having a pair of uprights mounted therein adjacent the opposite ends of one of its side boards; a corn-topping device connected with said uprights and including a jointed supporting bar disposed longitudinally of the wagon body, said bar consisting of a front member and a rear member hinged together at their mutually-adjacent inner ends, said front member being pivotally connected to the front upright; a two-part guide plate having each member thereof secured to the adjacent member of the bar; a guide-arm inclined outwardly and forwardly of the wagon body and connected to the rear member of said bar; a blade connected at opposite ends to the latter and to said guide-arm, said guide arm being adapted to direct the corn to said blade; means for raising the rear member of said bar; a depending arm carried by said rear member; and a rod connected at opposite ends to said arm and to the front upright, for breaking the joint between the front and rear members of said bar when said rear member is raised.

7. The combination, with a wagon body having a pair of uprights mounted therein adjacent the opposite ends of one of its side boards; a corn-topping device connected with said uprights and including a jointed supporting bar disposed longitudinally of the wagon body, said bar consisting of a front member and a rear member hinged together at their mutually-adjacent inner ends, said front member being pivotally connected to the front upright; a two-part guide plate having each member thereof secured to the adjacent member of the bar; a guide-arm inclined outwardly and forwardly of the wagon body and connected to the rear member of said bar; a blade connected at opposite ends to the latter and to said guide-arm, said guide-arm being adapted to direct the corn to said blade; means for raising the rear member of said bar; a depending arm carried by said rear member; a rod connected at opposite ends to said arm and to the front upright, for breaking the joint between the front and rear members of said bar when said rear member is raised; and means adapted for engagement with the rear member of said bar when the joint between the members of said bar is broken, to retain said members in adjusted position with respect to each other.

8. The combination, with a wagon body having a pair of uprights mounted therein adjacent the opposite ends of one of its side boards, of a corn-topping attachment connected with said uprights and comprising front and rear members hinged together at their mutually-adjacent inner ends, the front member being pivotally connected to the front upright; means for raising the rear member; means connecting said rear member with the front upright, for breaking the joint between said members when said rear member is raised; a strap carried by said rear member; and a toothed lever pivoted to the wagon body adjacent the rear upright and adapted for engagement with the strap, to retain said members in adjusted position with respect to each other when the joint between the same is broken.

9. The combination, with a wagon body having a pair of uprights mounted therein adjacent the opposite ends of one of its side boards, of a corn-topping attachment connected with said uprights and comprising front and rear members hinged together at their mutually-adjacent inner ends, the front member being pivotally connected to the front upright; means for raising the rear member; a depending arm carried by said rear member; a rod connected at opposite ends to said arm and to the front upright, for breaking the joint between said members, when said rear member is raised; a strap carried by said rear member; and a toothed lever pivoted to the wagon body adjacent the rear upright and adapted for engagement with said strap, to retain said members in adjusted position with respect to each other when the joint between the same is broken.

10. The combination, of a wagon body having a pair of uprights mounted therein adjacent the opposite ends of one of its side boards, the forward upright having a vertically-arranged series of perforations formed therethrough; a corn-topping device connected with the uprights and comprising front and rear members hinged together at their mutually-adjacent ends, the front member having a laterally-projecting pin adapted for engagement in one of the perforations in said forward upright; means for raising the rear member; a depending arm carried by said rear member; and a rod connected at its rear end to said arm and having its front end bent for engagement in one of the perforations in said forward upright, to break the joint between said front and rear members when the latter is raised.

11. The combination, of a wagon body having a pair of uprights mounted therein adjacent the opposite ends of one of its side boards, the forward upright having a vertically-arranged series of perforations formed therethrough; a corn-topping device connected with the uprights and comprising front and rear members hinged together at their mutually-adjacent ends, the front member having a laterally-projecting pin adapted for engagement in one of the perforations in said forward upright; means for raising the rear member; a depending arm carried by said rear member; a rod connected at its rear end to said arm and having its front end bent for engagement in one of the perforations in said forward upright, to break the joint between said front and rear members when the latter are raised; a strap carried by said rear member; and a toothed lever pivoted to the wagon body adjacent the rear upright, and adapted for engagement with said strap, to retain said members in adjusted position with respect to each other when the joint between the same is broken.

In testimony whereof, I affix my signature, in presence of two witnesses.

SAMUEL E. WOODS.

Witnesses:
 JOSEPHINE CURTIS,
 MYRTLE McMAHAN.